United States Patent [19]

Peters et al.

[11] Patent Number: 5,298,838

[45] Date of Patent: Mar. 29, 1994

[54] SENSORLESS BRUSHLESS DC MOTOR STARTING SYSTEM AND METHOD

[75] Inventors: David H. Peters, Westminster; Jeff Harth, Tustin, both of Calif.

[73] Assignee: Silicon Systems, Inc., Tustin, Calif.

[21] Appl. No.: 659,032

[22] Filed: Feb. 21, 1991

[51] Int. Cl.$^5$ ............................................. H02P 5/00
[52] U.S. Cl. .................................. 318/138; 318/254; 318/779; 388/847
[58] Field of Search ............... 318/138, 254, 439, 778, 318/779-782, 445; 388/842-847, 902-903, 907.5, 928

[56] References Cited

U.S. PATENT DOCUMENTS

| | | | |
|---|---|---|---|
| 4,162,435 | 7/1979 | Wright | 318/138 |
| 4,455,513 | 6/1984 | Fulton et al. | 318/138 |
| 4,641,066 | 2/1987 | Nagata et al. | 318/254 |
| 4,678,973 | 7/1987 | Elliott et al. | 318/254 |
| 4,922,169 | 5/1990 | Freeman | 318/138 X |
| 4,928,043 | 5/1990 | Plunkett | 318/721 X |
| 4,958,948 | 9/1990 | Seima et al. | 318/812 |
| 4,992,710 | 2/1991 | Cussat | 318/138 X |

Primary Examiner—William M. Shoop, Jr.
Assistant Examiner—David Martin
Attorney, Agent, or Firm—Hecker & Harriman

[57] ABSTRACT

A method for starting a sensorless brushless DC motor. The present invention uses the physical equations of motion of the motor to calculate commutation advancement rates during the motor's start-up period. An algorithm initially calculates the commutation advancement rates for the motor's maximum theoretical accelleration. The commutation applied to the motor is advanced through a predetermined number of commutation states using these maximum rates. After the predetermined number of commutation states have been applied, the speed of the motor is checked to determine whether the motor is spinning at a high enough speed to permit use of the motor's normal commutation state advancement system. If the motor is not up to speed, the rate at which the commutation states are advanced is incrementally decreased until satisfactory operation of the motor is obtained or until motor failure is diagnosed and starting is aborted. By starting at a high commutation state advancement rate and incrementally reducing the commutation advancement rate until proper accelleration of the motor is attained, the present invention continuously adapts the rate of advancement of the applied commutation states to the condition of the motor, thereby automatically compensating for changes in the motor's performance over time.

14 Claims, 3 Drawing Sheets

SENSORLESS BRUSHLESS DC MOTOR STARTING SYSTEM AND METHOD

BACKGROUND OF THE INVENTION

1. Field of the Invention

The present invention relates to the field of brushless DC motors, and more particularily to a method for starting sensorless brushless DC motors.

2. Background Art

In a brushless DC motor, commutation is provided by selectively applying DC current to the motor's field windings. Whether and in what direction current is applied to a particular winding depends on the physical and operational configuration of the motor and the rotational position of the motor's armature. Each motor has a discrete number of commutation states, depending on the number of windings or phases of the motor and the motor's mode of operation (e.g. unipolar, bi-polar, etc.). A three-phase motor in unipolar operation has three different commutation states. A three-phase motor in bi-polar operation has six different commutation states. The commutation states for a three-phase, bipolar motor are shown in Table 1.

TABLE 1

COMMUTATION STATES FOR THREE-PHASE BIPOLAR DC MOTOR

| Commutation State | Winding 1 | Winding 2 | Winding 3 |
|---|---|---|---|
| 1 | Positive | Negative | Open |
| 2 | Positive | Open | Negative |
| 3 | Open | Positive | Negative |
| 4 | Negative | Positive | Open |
| 5 | Negative | Open | Positive |
| 6 | Open | Negative | Positive |
| and repeating: | | | |
| 1 | Positive | Negative | Open | where:

Positive means that a positive potential is applied to the indicated winding.

Negative means that a negative potential is applied to the indicated winding.

Open means that no potential is applied to the indicated winding

For continuous operation of the motor, the commutation applied to the motor must be advanced to successive commutation states as the motor rotates. Each commutation state is applicable over a finite angular displacement of the motor's armature. This finite angular displacement can be calculated from the formula:

$$THETA = (2*PI)/(POLES*PHASES)$$

where:
THETA = angular displacement in radians
PI = 3.14159265
POLES = number of poles on armature
PHASES = number of phases For a three-phase motor having a 12-pole armature, the above equation results in a value for THETA of 0.1745 radians or 10 degrees. Anotherwords, each commutation state applies for 1/36th of a revolution. The applied commutation must be advanced to the succeeding commutation state after every 10 degrees of the armature's rotation. For one complete revolution, 36 successive commutation states must be applied, corresponding to six cycles through the six commutation states listed on Table 1.

For the proper timing of commutation advancement, a means for determining the angular position of the motor's armature is required. In sensored brushless DC motors of the prior art, optical or hall effect position sensors are used to determine the angular position of the motor's armature. In sensorless brushless DC motors, however, the angular position of the armature is not measured directly. Instead, it is deduced from a characteristic polarity reversal that occurs in back EMF induced by the rotation of the armature in the motor's undriven field coil windings. Sensorless brushless DC motors have the advantage of simplicity and reduced cost since the need for separate angular position sensors is eliminated. However, the armature must be rotating at a significant angular velocity before sufficient back EMF is produced to allow back EMF sensing. It has heretofore been difficult to provide effective commutation of a sensorless brushless DC motor during the motor's start up period when the motor is spinning below this speed.

One method that has been used in the prior art is generating a fixed frequency timing pulse that triggers successive commutation states. The frequency of the timing pulse must be greater than the frequency at which commutation states advance at a rotational speed of the motor at which sufficient back EMF is generated to allow effective back EMF sensing.

This starting method has several drawbacks. Upon initial start-up, the timing pulses advance the applied commutation states more quickly than the angular position of the armature requires. As a result of this incorrect timing, the current supplied to the motor's field windings by the successively applied commutation states at times will oppose the motor's rotation, causing erratic and inefficient rotational accelleration of the motor and long start-up times. In the worst case, reverse rotation of the motor can occur.

SUMMARY OF THE PRESENT INVENTION

The present invention consists of a system and method for generating a timing pattern for advancing commutation states during start-up of a sensorless brushless DC motor based on the physical design characteristics of the motor. An initial sequence of timing values is generated based on the motor's electrical and physical characteristics and the magnitude of the applied current. The commutation applied to the motor is advanced through successive commutation states according to these calculated timing values. At the end of the timing value sequence, the speed of the motor is checked to determine whether the motor has accellerated sufficiently to allow commutation through back-EMF sensing. If the motor's speed is adequate, the motor's back-EMF sensing commutation system is implemented. If the motor's speed is not adequate, the commutation rate is successively decreased, and the starting cycle is re-initiated. This speed checking/timing-value-incrementation cycle is repeated until either the required operating speed has been obtained or until a predetermined number of starting cycles have been run, at which point the starting procedure is aborted.

DETAILED DESCRIPTION OF THE PRESENT INVENTION

A sensorless, brushless DC motor starting system and method is described. In the following description, numerous specific details, such as number of phases, motor speed, etc., are set forth in detail in order to provide a more thorough description of the present invention. It will be apparent, however, to one skilled in the art, that the present invention may be practiced without these specific details. In other instances, well known features have not been described in detail so as not to obscure the present invention.

The present invention uses the physical equations of motion for a brushless DC motor to calculate timing intervals for advancing the applied commutation states during the start-up phase of the motor. The resulting sequence of timing values is referenced by a motor controller. The controller sends triggering signals to a commutation generator at the time intervals corresponding to the timing values. The commutation generator advances the commutation applied to the motor from the current commutation state to the next succeeding commutation state each time a triggering signal is received. If the motor is not up to the required speed after the sequence of timing values is exhausted, the starting procedure is started anew. This time, however, the timing values in the timing sequence are increased by multiplying each of them by a "timing adjustment factor". If, after the sequence of timing values has again been exhausted, the motor is still not up to speed, the adjustment factor is increased. This process is repeated until either the motor is up to speed or a predetermined cycling limit is exceeded, in which case motor start-up is aborted.

Calculation of the Start-up Timing Values

The sequence of timing values is calculated by using the basic physical equations of motion for the motor to calculate the incremental time it should theoretically take for the armature of the motor to rotate through an angular displacement equal to the angular distance between successive commutation states of the motor. The following equations are used:

$$ALPHA = (KT*I)/J \quad (101)$$
$$THETA_0 = (2*PI)/(POLES*PHASES) \quad (102)$$
$$THETA = (ALPHA/2)*(T^2) + (W*T) \quad (103)$$

$$T_n = \frac{-W_{n-1} + SQR(W_{n-1}^2 - (4*(ALPHA/2)*(-THETA_0)))}{2*(ALPHA/2)} \quad (104)$$

$$W_n = W_{n-1} + (ALPHA*T_n) \quad (105)$$

Where:
ALPHA = angular accelleration of rotor in radians/sec$^2$
KT = motor torque constant in oz-in/Amp
I = applied current in Amps
J = motor and load inertia in oz-in-sec$^2$
PI = 3.14159265
POLES = number of motor poles
PHASES = number of motor phases
THETA$_0$ = angular displacement between commutation states in radians
THETA = angular displacement in radians
T = time in seconds
W = angular velocity in radians/second
T$_n$ = time in seconds till next commutation state Equation 101 is the equation for the angular acceleration ("ALPHA") of an electric motor as a function of the applied current ("I"), the motor's characteristic torque constant ("KT"), and the motor's and the attached load's moment of inertia ("J"). For a given motor, KT and J will ordinarily be constants. ALPHA will therefore be dependent only on the applied current I. Since it is desired to accellerate the motor up to its self-commutating speed as quickly as possible, in the preferred embodiment of the present invention I is held constant at the maximum current available from the motor's power supply. Since I in this case is also constant, equation 101 will result in a fixed value for the motor's angular accelleration ALPHA.

Equation 102 is used to calculate the angular displacement THETA$_0$ between successive commutation states. The number of commutation states per revolution is equal to the product of the PHASES and POLES of the motor. In equation 102, the angular displacement THETA$_0$ between commutation states is calculated by dividing the angular displacement corresponding to one revolution (2 PI radians) by the number of commutation states per revolution (POLES times PHASES). Since the number of POLES and PHASES for a motor are constants determined by the motor's design, THETA$_0$ will be a constant for a particular motor.

Equation 103 is the equation for calculating the angular displacement THETA over a time interval T for an object rotating at an initial angular velocity of W and accellerating and an angular accelleration of ALPHA. By substituting THETA$_0$ for THETA and solving for time T, this equation can be used to calculate the length of time that the applicable commutation state is applied before the subsequent commutation state should be applied. The resultant formula for T$_n$, the time period over which a particular commutation state S$_n$ is applicable, constitutes equation 104.

Equation 104 gives T$_n$ as a function of W$_{n-1}$ (the angular velocity at the beginning of time interval n, which is equivalent to the angular velocity at the end of time internal n−1), ALPHA and THETA$_0$. As explained above, ALPHA and THETA$_0$ will generally be constants for a given motor design. Accordingly, T$_n$, the time interval over which commutation state S$_n$ applies, will be a function basically of W$_{n-1}$, the angular velocity of the motor at the beginning of the interval.

Since the motor is starting from rest, W$_0$, the angular velocity of the motor at the beginning of the first time interval T$_1$, is equal to zero. For subsequent intervals T$_n$, the initial angular velocity W$_{n-1}$ at the beginning of the interval is calculated using equation 105.

Table 2 shows a BASIC computer program that can be used to calculate the time intervals T for a predetermined number of commutation states N. The program asks for values for the variables KT, I, J, POLES, PHASES and the number of successive commutation states N for which values of T are desired. The program then uses equations 101-105 to calculate T for each commutation state 1 through N. The program prints out values for N, T, total time, and final RPM for each interval. After the values for the Nth state have been calculated, the program assigns a final value of "0" to T$_{n+1}$ to indicate the end of the list of calculated commutation state timing intervals. Table 3 illustrates a sample printout from the program of Table 2 for N equal to 20 for a 12-pole, 3-phase motor having a torque constant KT of 3.7 oz in/amp, a effective rotational inertia J of 0.024 oz-in-sec$^2$, and an applied current I of 1 amp. As shown in Table 3, the time interval T between successive commutation states ranges from 47 milliseconds for the first interval down to 5 milliseconds for the twentieth interval. The total time to cycle through the listed 20 commutation states is 212 milliseconds, and the projected speed of the motor at the end of the 20th commutation state is 313 RPM.

Using the Calculated Timing Values

Figure 3:
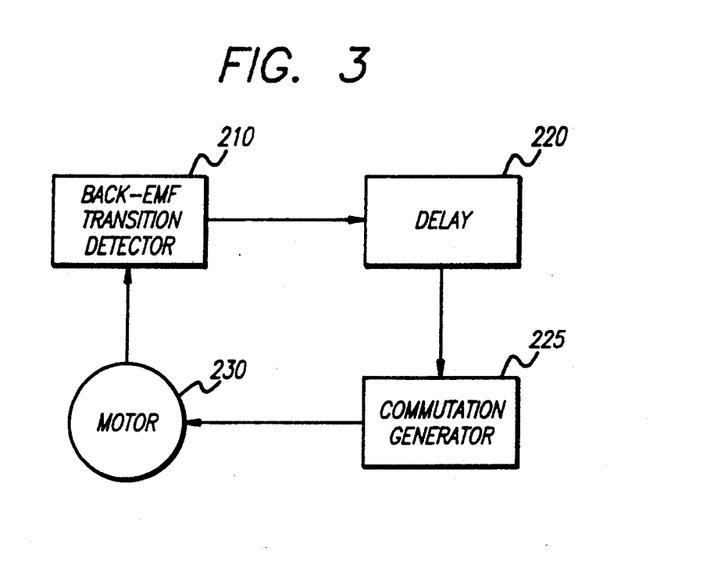
FIG. 3 is a schematic block diagram of a back-EMF sensing cummutation advancement system.

A simplified block diagram of a typical back-EMF-sensing commutation system for a sensorless brushless DC motor is illustrated in FIG. 3. The system consists of a back-EMF transition detector 210, a delay 220, and a commutation generator 225. The system works as follows.

Back-EMF transition detector 210 detects a transition in the back-EMF generated in an appropriate undriven leg of of the motor across a predetermined reference value. In a three-phase motor operating in a bipolar mode, at any time there are two driven legs (one positive, one negative) and one undriven leg. The back EMF induced in the undriven leg will be either rising from a negative to a positive or falling from a positive to a negative, according to the commutation state sequence shown in Table 1. The transition point detected is typically the point at which the back-EMF passes the neutral point and changes from negative to positive or vice-versa. When such a transition is detected, the back-EMF detector 210 generates a clock signal that is sent to commutation generator 225 by means of delay 220.

Delay 220 is used because the optimum time for commutation state advancement actually occurs somewhat after the transition point detected by back-EMF transition detector 210. Delay 220 compensates for this time discrepancy by delaying the clock signal generated by back-EMF transition detector 210 by a predetermined amount of time. This delay is typically on the order of a few microseconds.

Commutation generator 225 generates the commutation states necessary for operation of the motor, advancing the applied commutation from one commutation state to the next every time it receives a delayed clock signal from back-EMF transition detector 210. For example, for a motor having the commutation states listed in Table 1, the first clock signal received by commutation generator 225 causes it to generate commutation state 1: a positive potential is applied to winding #1 a negative potential is applied to winding #2, while no potential is applied to winding #3. The next clock signal advances commutation generator 225 to commutation state 2: the positive potential remains applied to winding #1, but this time winding #3 receives a negative potential, while the negative potential applied to winding #2 during the previous commutation state is removed. Each succeeding clock signal advances commutation generator 225 to the next succeeding commutation state. Commutation generator 225 cycles through commutation states 1 through 6, and then starts again at state 1.

During initial start up of the motor, the speed of the motor is too slow to generate the amount of back-EMF needed for operation of back-EMF transition detector 210. An alternative means must therefore be used to provide the clock signals needed by commutation generator 225. In the prior art, a simple variable frequency clock signal generator, designated item 235 in FIG. 4, has been used. Clock signal generator 235 generates clock signals at an increasing rate unrelated to motor and load characteristics. Each clock signal advances the commutation provided by commutation generator 225 to the next succeeding commutation state.

Figure 4:
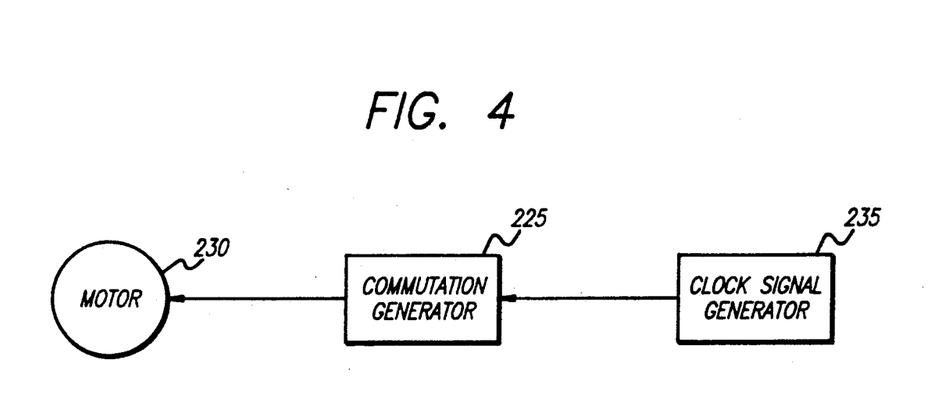
FIG. 4 is a schematic block diagram of a prior art sensorless brushless DC motor starting system.

The motor, since it is starting from rest, is at first moving much slower than 300 RPM. The clock signals generated by clock signal generator 235 therefore initially advance the commutation states generated by commutation generator 225 more quickly than the speed of the motor requires. As a result, the commutation applied to the motor will often be inappropriate for the given rotational position of the motor. The resulting torque exerted on the motor may slow down the motor, cause erratic accelleration, or in the worst case even reverse the motor's direction.

In the present invention clock signals are not generated at a constant rate as in the prior art. Instead, the sequence of timing values calculated by the program of Table 2 are used to generate clock signals at an accellerating rate corresponding to the theoretically predicted rate of accelleration of the motor. For example, using the timing values listed in Table 3, first, an initial clock signal is generated. A second clock is generated 47 milliseconds after the first. A third is generated 19 milliseconds after the second, a forth 15 milliseconds after the third, and so on according to the timing value sequence.

Figure 1:
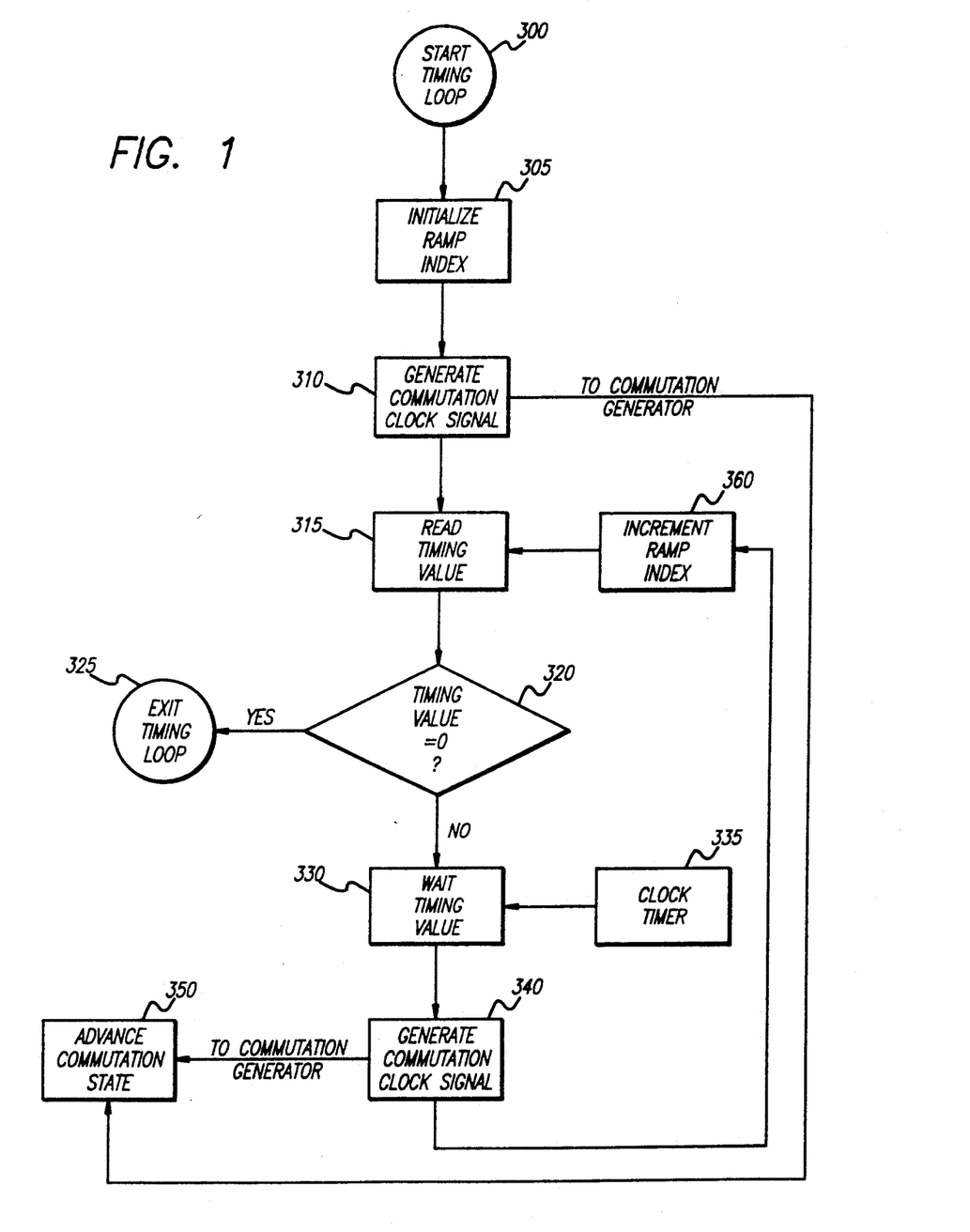
FIG. 1 is a block diagram of a first embodiment of the timing algorithm of the present invention.

FIG. 1 shows an example of a "timing loop" algorithm that can be used by a motor controller's microprocessor to generate clock signals according to the timing values in the timing value sequence. In this example, the timing value sequence is calculated off line and stored in the microprocessor's memory.

The timing loop starts at block 300. First, a "ramp index" is initiallized at block 305 to keep track of the position of the currently used timing value in the timing value sequence. Next, an initial clock signal is sent to the commutation generator at block 310 to advance the commutation generator one commutation state to insure that positive torque is applied to the motor. The first timing value is read at block 315. The timing value is checked at block 320 to see whether it is equal to zero. If the value is zero (which indicates that the end of the sequence of timing values has been reached), the timing loop is exited at block 325. If the value is not zero, a waiting period commences at block 330. The waiting period continues for a length of time that corresponds to the current timing value. In FIG. 1, the waiting period is measured by counting the timing signals produced by a timing clock at block 335. The correct time interval will be reached after a number of pulses of the timing clock equal to the current timing value have been counted. For example, the first timing value in Table 3 is "47". If a 1 khz timing clock frequency is used, the waiting period for this interval will continue until 47 1 khz pulses have been counted. For a clock operating at a different frequency, the number of pulses counted during each time interval are adjusted accordingly. In the preferred embodiment of the present invention, a clock frequency of 2 khz is used. In this case, the timing values listed in Table 3 would have to be multiplied by two to get the number of pulses that must be counted during each interval.

After the waiting period has expired, a clock signal is generated at 340 and sent to the commutation generator to advance the commutation applied by the commutation generator to the next commutation state. After the clock signal has been sent, the ramp index is incremented at 360 and the next timing value is read at 315. Steps 315 through 360 are repeated until all the timing values in the sequence have been used. Assuming 1) that a sufficient number of commutation states have been applied to the motor and 2) the motor accellerates according to its optimum theoretical capabilities, the motor will then be running fast enough to switch to the motor's normal back-EMF sensing mode of commutation.

In practice, a motor sometimes does not perform up to its optimum theoretical capabilities. If the applied commutation states are advanced at a rate based on the motor's optimum theortetical accelleration, while the motor is actually accellerating more slowly, there will be a mismatch between the applied commutation states and the commutation states actually required by the motor. As a result, the motor may not accellerate sufficiently to have the speed necessary for back-EMF sensing at the end of the timing value sequence. To compensate for this gap between the predicted and actual performance of the motor, the motor starting method of the present invention uses an "adaptive loop" to adjust the timing values in the sequence to reflect the motor's actual performance.

Figure 2:
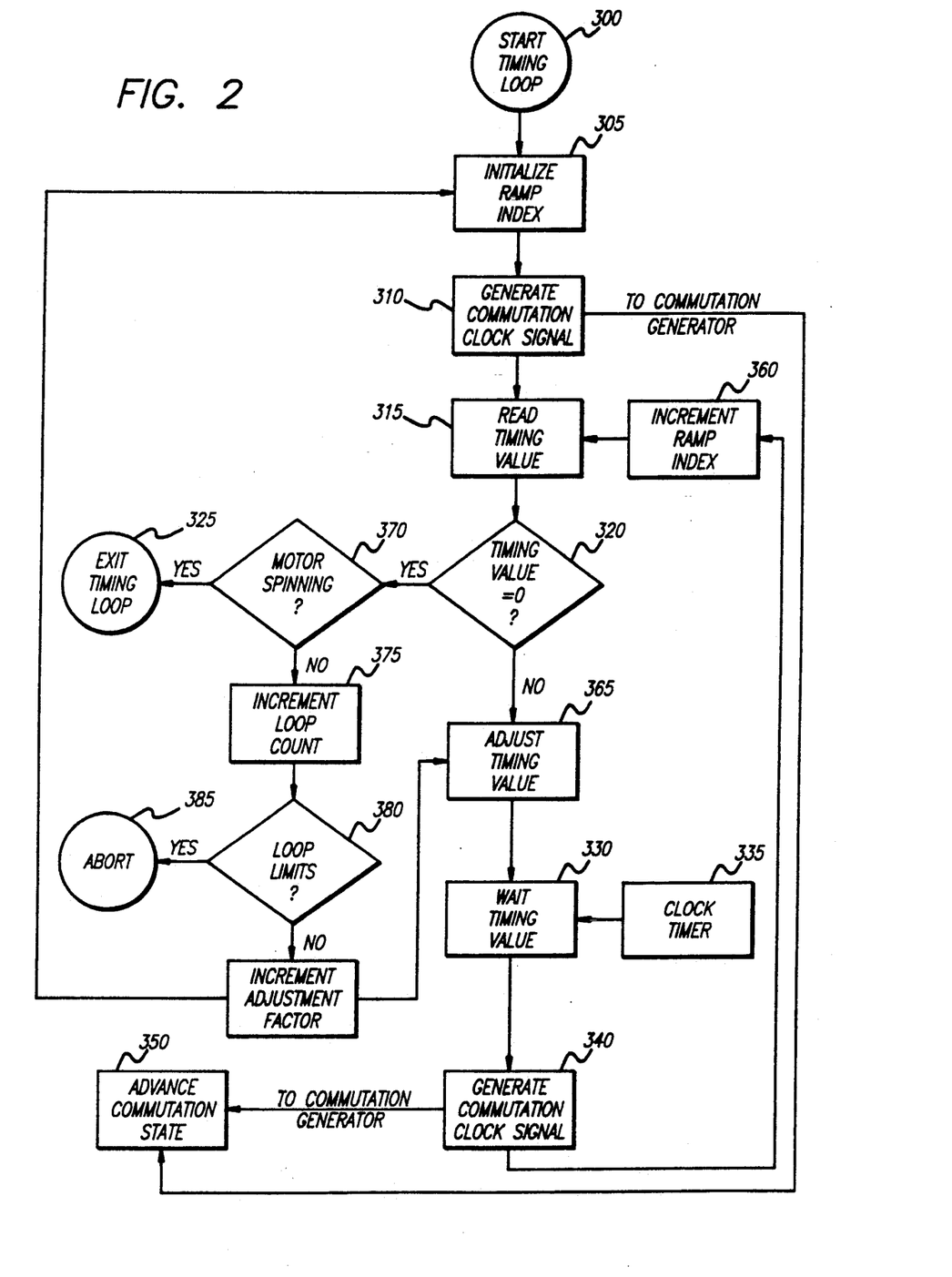
FIG. 2 is a block diagram of the preferred embodiment of the timing algorithm of the present invention including an adaptive loop.

FIG. 2 shows this adaptive loop added to the basic timing loop algorithm illustrated in FIG. 1. As shown in FIG. 2, the adaptive loop operates between block 320 and block 325 of the timing loop of FIG. 2. The adaptive loop is entered after the end of the stored sequence of timing values has been reached, which is indicated by a timing value of "0". The adaptive loop first checks to see whether the motor is spinning at a speed that is high enough to allow back-EMF commutation. This spin check is done at block 370 in FIG. 2. If the speed of the motor is adequate, the adaptive loop is exited at block 325 and the motor's back-EMF sensing commutation system takes over. If the speed of the motor is not adequate, the adaptive loop is continued. A loop count index that keeps track of how many times the adaptive loop is run is incremented at block 375, and the loop index is checked to see whether it exceeds a predetermined loop limit at block 380. In the preferred embodiment, a loop limit of eight is used. If the loop limit is exceeded, the starting procedure is aborted at block 385.

If the loop limit has not been exceeded, the adaptive loop continues. As mentioned above, if the motor is not up to speed when all the timing values in the sequence have been used, it means that the applied commutation states are being advanced too quickly for the rotational speed of the motor. To compensate for the motor's less-than-theoretically-maximum accelleration, the adaptive loop slows down the rate at which the applied commutation states are advanced. A "timing adjustment factor" is multiplied by each timing value as it is read in the timing loop to give adjusted values that compensate for the slower accelleration of the motor. This multiplication occurs at a new block 365 inserted into the timing loop between blocks 320 and 330. The adjustment factor initially has a value of 1, such that there is no adjustment of the timing values the first time the timing loop is run. Each time the adaptive loop is entered, the adjustment factor is increased. In the preferred embodiment, the adjustment factor is increased by a factor of 1.25 during each cycle of the adaptive loop. This amount of increase is not required, however, and other values may be used. After the new value for the adjustment factor is calculated at block 390, the ramp index is once again initialized and the timing loop is run again. During this cycle of the timing loop, the length of the time between successive commutation states will be increased over the previous cycle by a factor equal to the adjustment factor. Accordingly, the applied commutation states will be advanced at a slower rate, reflecting the slower-than-theoretically-maximum rate of accelleration of the motor.

After the timing loop is completed using the adjusted index values, the adaptive loop is once again entered at decision block 320. If the motor is still not up to speed, the adaptive loop is repeated. The loop is repeated until the motor starts or until the loop count limit is exceeded.

A sensorless brushless DC motor start algorithm has thus been presented. The present invention uses the physical equations of motion of the motor to calculate commutation advancement rates during the motor's start-up period. The algorithm initially calculates the commutation advancement rates for the motor's maximum theoretical accelleration. The commutation applied to the motor is advanced through a predetermined number of commutation states using these maximum rates. After the predetermined number of commutation states have been applied, the speed of the motor is checked to determine whether the motor is spinning at a high enough speed to permit use of the motor's normal commutation state advancement system. If the motor is not up to speed, the rate at which the commutation states are advanced is successively decreased until satisfactory operation of the motor is obtained or until motor failure is diagnosed and starting is aborted. By starting at a high commutation state advancement rate and incrementally decreasing the commutation advancement rate until proper accelleration of the motor is attained, the present invention continuously adapts the rate of advancement of the applied commutation states to the condition of the motor, thereby automatically compensating for changes in the motor's performance over time.

TABLE 2

```
10 PRINT "INPUT KT": INPUT KT
15 PRINT "INPUT I": INPUT I
20 PRINT "INPUT J": INPUT J
25 PRINT "INPUT POLES": INPUT POLES
30 PRINT "INPUT PHASES": INPUT PHASES
35 PRINT "INPUT N": INPUT N
37 DIM W(N), T(N + 1), TM(N + 1)
40 ALPHA = (KT*I)/J
45 THETA0 = (2*3.14159265)/(POLES*PHASES)
50 W(0) = 0; TT = 0
55 PRINT "INTERVAL", "T(msec)", "TTotal(msec)", "RPM"
57 PRINT "----------------------------------------"
```

TABLE 2-continued

```
60 FOR K = 1 TO N
65 T(K) = (-W(K - 1) + SQR((W(K - 1)  2) - (4*(ALPHA/2)*(-THETA0))))/
ALPHA
70 W(K) = W(K - 1) + (ALPHA*T(K))
75 TT = TT + T(K)
80 TTM = FIX(1000*TT)
85 TM(K) = FIX(1000*T(K))
90 RPM = FIX((ALPHA*TT*60)/(2*3.14159265))
95 PRINT K, TM(K), TTM, RPM
100 NEXT K
105 T(N + 1) = 0: TM(N + 1) = 0
110 PRINT "END", TM(N + 1)
115 END
```

TABLE 3

```
RUN
INPUT KT
? 3.7
INPUT I
? 1
INPUT J
? .024
INPUT POLES
? 12
INPUT PHASES
? 3
INPUT N
? 20
```

| INTERVAL | T(msec) | TTOTAL(msec) | RPM |
|---|---|---|---|
| 1 | 47 | 47 | 70 |
| 2 | 19 | 67 | 99 |
| 3 | 15 | 82 | 121 |
| 4 | 12 | 95 | 140 |
| 5 | 11 | 106 | 156 |
| 6 | 10 | 116 | 171 |
| 7 | 9 | 125 | 185 |
| 8 | 8 | 134 | 198 |
| 9 | 8 | 142 | 210 |
| 10 | 7 | 150 | 221 |
| 11 | 7 | 157 | 232 |
| 12 | 7 | 164 | 242 |
| 13 | 6 | 171 | 252 |
| 14 | 6 | 177 | 261 |
| 15 | 6 | 184 | 271 |
| 16 | 6 | 190 | 280 |
| 17 | 5 | 196 | 288 |
| 18 | 5 | 201 | 297 |
| 19 | 5 | 207 | 305 |
| 20 | 5 | 212 | 313 |
| END | 0 | | |
| Ok | | | |

We claim:

1. A method of accelerating a sensorless, brushless, DC motor to a desired speed comprising the steps of:
   calculating theoretical time intervals of decreasing length between a first predetermined number of successive commutation states of said motor based on a plurality of physical equations of motion for said motor and a magnitude of an applied current;
   sequentially supplying to said motor a first set of drive signals corresponding to said first predetermined number of successive commutation states at an increasing rate corresponding to said calculated theoretical time intervals;
   maintaining each of said drive signals of said first set of drive signals for a period of time corresponding to said calculated theoretical time intervals;
   monitoring an achieved speed of said motor; and
   adjusting said calculated theoretical time intervals to compensate for discrepancies between said achieved speed and said desired speed of said motor.

2. A method of accelerating a sensorless, brushless, DC motor to a desired speed comprising the steps of:
   calculating theoretical time intervals of decreasing length between a first predetermined number of successive commutation states of said motor based on a plurality of physical equations of motion for said motor and a magnitude of an applied current;
   sequentially supplying to said motor a first set of drive signals corresponding to said first predetermined number of successive commutation states at an increasing rate corresponding to said calculated theoretical time intervals;
   maintaining each of said drive signals of said first set of drive signals for a period of time corresponding to said calculated theoretical time intervals;
   monitoring an achieved speed of said motor after said first set of drive signals have been supplied to said motor;
   determining whether said achieved speed by the motor has reached said desired speed;
   if said achieved speed of said motor is less than said desired speed, increasing the calculated time intervals by a predetermined factor;
   sequentially supplying to said motor a second set of drive signals corresponding to said first predetermined number of successive commutation states; and
   maintaining each of said drive signals of said second set of drive signals for a period of time corresponding to said increased calculated time interval.

3. The method of claim 2 further comprising the steps of:
   monitoring said achieved speed by said motor after each set of drive signals have been supplied to said motor;
   determining whether said achieved speed by said motor has reached said desired speed;
   if said achieved speed of said motor is less than said desired speed, incrementally increasing the calculated time intervals by said predetermined factor;
   sequentially supplying to the motor an additional set of drive signals corresponding to said first predetermined number of successive commutation states; and
   maintaining each of said drive signals of said additional set of drive signals for a period of time corresponding to said corresponding incrementally increased time interval.

4. The method of claim 3 further comprising the steps of:

monitoring the number of sets of drive signals supplied to said motor; and, ceasing to supply drive signals to said motor if said number of sets of drive signals supplied to said motor exceeds a second predetermined number.

5. The method of claim 4 wherein said step of calculating theoretical time intervals is accomplished by:

$$T_n = \frac{-W_{n-1} + SQR(W_{n-1}^2 - (4*(ALPHA/2)*(-THETA_0)))}{2*(ALPHA/2)};$$

where:
ALPHA = angular acceleration of said motor in radians/sec$^2$;
THETA$_0$ = angular displacement between commutation states in radians;
T$_n$ = time intervals in seconds;
W$_{n-1}$ = the angular velocity at the beginning of time interval n; and
SQR represents the square root of the expression that follows.

6. A system for providing start-up commutation to a sensorless, brushless, DC motor comprising:
processing means for calculating a sequence of timing values between successive commutation states of the motor based on a plurality of physical equations of motion for said motor and a magnitude of an applied current;
storage means coupled to said processing means for storing said sequence of predetermined timing values;
commutation generator means coupled to said motor for generating motor drive signals corresponding to the commutation states of said motor; and
clock signal generating means coupled to said storage means and a commutation advancement means, for generating clock signals corresponding to said stored timing values and transmitting said clock signals to said commutation advancement means, said commutation advancement means for advancing said motor drive signals generated by said commutation generator means to correspond to a succeeding commutation state of the motor each time one of said clock signals is received from said clock signal generator means.

7. The motor commutation system of claim 6 wherein said commutation generator means comprises said commutation advancement means.

8. The motor commutation system of claim 6 further comprising a motor speed monitoring means coupled to said motor.

9. The motor commutation system of claim 6 further comprising an adjustment means coupled to said storage means and said clock signal generating means, said adjusting means for incrementally increasing said stored timing values.

10. The method of claim 9 wherein said step of calculating theoretical time intervals is accomplished by:

$$T_n = \frac{-W_{n-1} + SQR(W_{n-1}^2 - (4*(ALPHA/2)*(-THETA_0)))}{2*(ALPHA/2)};$$

where:

ALPHA = angular acceleration of said motor in radians/sec$^2$;
THETA$_0$ = angular displacement between commutation states in radians;
T$_n$ = time intervals in seconds;
W$_{n-1}$ = the angular velocity at the beginning of time interval n; and
SQR represents the square root of the expression that follows.

11. A method of accelerating a sensorless, brushless, DC motor to a desired speed comprising the steps of:
calculating theoretical time intervals between a first predetermined number of successive commutation states of said motor based on physical equations of motion for the motor and a magnitude of an applied current;
sequentially supplying to said motor a first set of drive signals corresponding to said first predetermined number of successive commutation states;
maintaining each of said drive signals of said first set of drive signals for a period of time corresponding to said corresponding calculated theoretical time intervals;
monitoring an achieved speed by said motor after said first set of drive signals have been supplied to said motor;
determining whether said achieved speed by the motor has reached said desired speed;
if said achieved speed of said motor is less than said desired speed, increasing the calculated time intervals by a predetermined factor;
sequentially supplying to said motor a second set of drive signals corresponding to said first predetermined number of successive commutation states;
maintaining each of said drive signals of said second set of drive signals for a period of time corresponding to said corresponding increased time interval;
monitoring said achieved speed by said motor after each set of drive signals have been supplied to said motor;
determining whether said achieved speed by the motor has reached said desired speed;
if said achieved speed of said motor is less than said desired speed, increasing the calculated time intervals by a predetermined factor;
sequentially supplying to said motor an additional set of drive signals corresponding to said first predetermined number of successive commutation states; and
maintaining each of said drive signals of said additional set of drive signals for a period of time corresponding to said corresponding incrementally increased time interval.

12. The method of claim 11 further comprising the steps of:
monitoring the number of sets of drive signals supplied to said motor; and
ceasing to supply drive signals to said motor if said number of sets of drive signals to said motor exceeds a second predetermined number.

13. The method of claim 12 wherein said step of calculating theoretical time intervals is accomplished by:

$$T_n =$$

$$\frac{-W_{n-1} + SQR(W_{n-1}^2 - (4*(ALPHA/2)*(-THETA_0)))}{2*(ALPHA/2)};$$

where:
- ALPHA = angular acceleration of said motor in radians/sec$^2$;
- THETA$_0$ = angular displacement between commutation states in radians;
- T$_n$ = time intervals in seconds;
- W$_{n-1}$ = the angular velocity at the beginning of time interval n; and
- SQR represents the square root of the expression that follows.

14. A method of starting a sensorless, brushless, DC motor comprising steps of:

calculating theoretical time intervals of decreasing length between successive commutation states of the motor based on motion of said motor and a magnitude of an applied current; and advancing the commutation applied to the motor to successive commutation states at an increasing rate corresponding to said calculated theoretical time intervals;

wherein said step of calculating theoretical time intervals is accomplished by:

$$T_n = \frac{-W_{n-1} + SQR(W_{n-1}^2 - (4*(ALPHA/2)*(-THETA_0)))}{2*(ALPHA/2)};$$

where:
- ALPHA = angular acceleration of said motor in radians/sec$^2$;
- THETA$_0$ = angular displacement between commutation states in radians;
- T$_n$ = time intervals in seconds;
- W$_{n-1}$ = the angular velocity at the beginning of time interval n; and
- SQR represents the square root of the expression that follows.

* * * * *